US012341825B2

(12) United States Patent
Gaito et al.

(10) Patent No.: US 12,341,825 B2
(45) Date of Patent: Jun. 24, 2025

(54) TRANSMITTING OR RECEIVING VERSION INFORMATION OF TRANSMISSION PROTOCOL

(71) Applicant: Telefonaktiebolaget LM Ericsson (publ), Stockholm (SE)

(72) Inventors: Daniele Gaito, Naples (IT); Elvira Villani, Salerno (IT); Francesco Attanasio, Roccapiemonte (IT); Gennaro Falanga, Torre Annunziata (IT); Gianpaolo Di Mauro, Nocera Superiore (IT); Giuseppe Celozzi, Naples (IT); Rosa Catapano, Salerno (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/928,116

(22) PCT Filed: May 29, 2020

(86) PCT No.: PCT/EP2020/065044
§ 371 (c)(1),
(2) Date: Nov. 28, 2022

(87) PCT Pub. No.: WO2021/239257
PCT Pub. Date: Dec. 2, 2021

(65) Prior Publication Data
US 2024/0380792 A1    Nov. 14, 2024

(51) Int. Cl.
*H04L 9/40* (2022.01)
(52) U.S. Cl.
CPC .................... *H04L 63/30* (2013.01)
(58) Field of Classification Search
None
See application file for complete search history.

(56) References Cited

U.S. PATENT DOCUMENTS 8,850,182 B1 * 9/2014 Fritz ............... H04L 63/0428
713/150
9,628,579 B2 * 4/2017 Li ..................... H04M 15/888
(Continued)

FOREIGN PATENT DOCUMENTS

CN         101005409 A        7/2007

OTHER PUBLICATIONS

"ETSI TS 103 221-1 V1.6.1", Lawful Interception (LI); Internal Network Interfaces; Part 1: X1, Dec. 2019, 1-44.
(Continued)

*Primary Examiner* — Brandon Hoffman
(74) *Attorney, Agent, or Firm* — Murphy, Bilak & Homiller, PLLC

(57) ABSTRACT

A request associated with a destination to which a point of interception, POI, (135) is to transmit intercepted data via an X2/X3 interface during lawful interception, LI, is received from an administrative function, ADMF (108), via an X1 interface. The request comprises an identifier of the destination and version information that specifies at least one version of a transmission protocol to use by the POI for transmission of intercepted data to the identified destination. The POI determines whether or not the POI is able to transmit intercepted data via the X2/X3 interface using a version of the protocol that is equal to one of the versions in the received version information. The received version information is compared with version information available in the POI. A response is transmitted via the X1 interface that indicates if the POI is able to transmit intercepted data via the X2/X3 interface.

13 Claims, 5 Drawing Sheets

(56) References Cited

U.S. PATENT DOCUMENTS

| | | |
|---|---|---|
| 2011/0280216 A1 | 11/2011 | Li et al. |
| 2014/0233384 A1* | 8/2014 | Howard ................ H04L 67/568 370/235 |
| 2015/0200972 A1 | 7/2015 | Suryavanshi et al. |

OTHER PUBLICATIONS

"ETSI TS 103 221-2 V1.1.1", Lawful Interception (LI); Part 2: Internal Network Interface X2/X3 for Lawful Interception, Mar. 2019, 1-28.

"ETSI TS 103 221-2 V1.2.1", Lawful Interception (LI); Internal Network Interfaces; Part 2: X2/X3, vol. TC LI Lawful Interception, Oct. 2019, 1-29.

Moriarty, K., et al., "Effects of Pervasive Encryption on Operators", Internet Engineering Task Force (IETF), Request for Comments: 8404, Jul. 2018, 1-53.

* cited by examiner

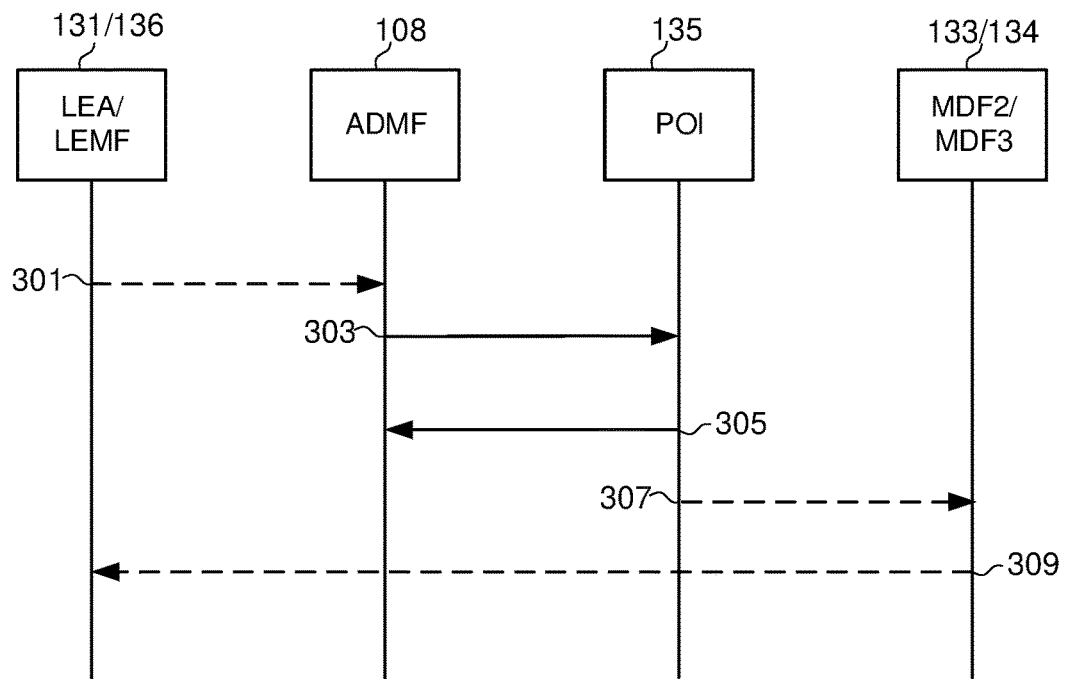
*Fig. 3a*
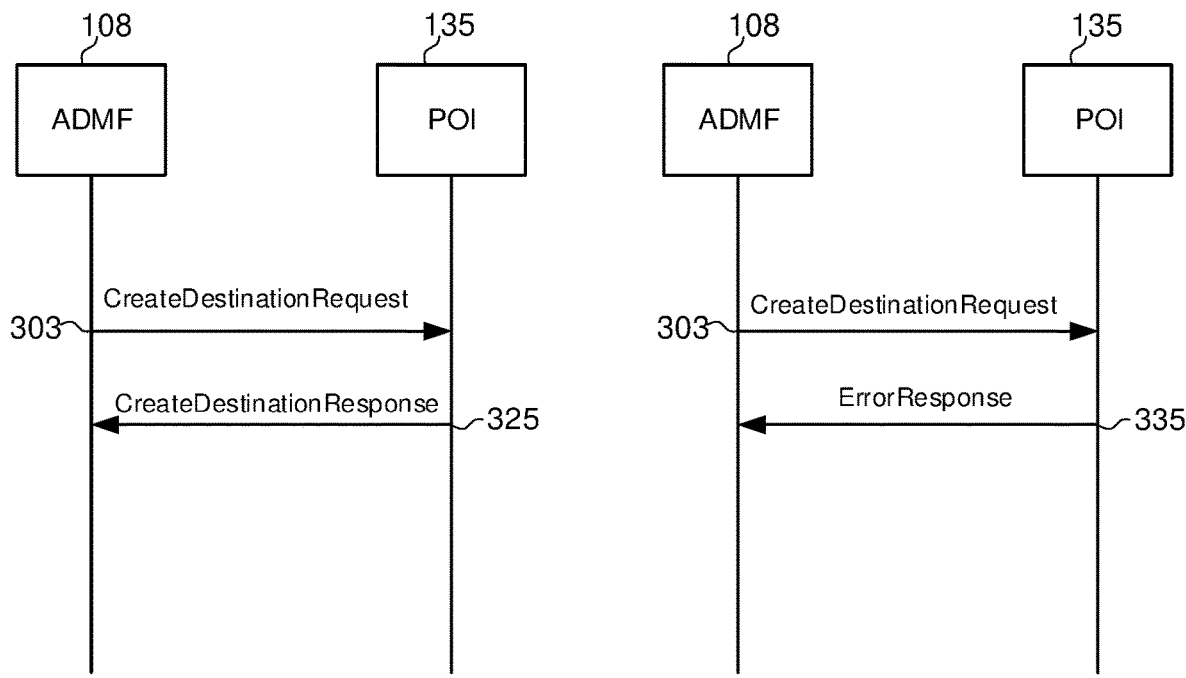
*Fig. 3b*  *Fig. 3c*

TRANSMITTING OR RECEIVING VERSION INFORMATION OF TRANSMISSION PROTOCOL

TECHNICAL FIELD

Embodiments herein relate to a method performed by a lawful interception administrative function in a telecommunication network, a method performed by a point of interception in a network element in a telecommunication network, corresponding computer systems as well as computer programs and carriers of such computer programs.

BACKGROUND

Lawful interception (LI) of traffic between communicating entities in a telecommunication network involves interaction between several functions in a core network that is part of the telecommunication network. For the purpose of the present disclosure, it is enough to mention a few functions such as an LI administrative function (ADMF), a point of interception (POI) within a network element (NE) and a mediation function (MF). As will be exemplified further in the detailed description below, an NE in the present context is an entity in the core network that is involved in the communication activity that is subject to LI.

Communication between entities in the core network, in an LI context, is subject to various standards in the form of technical specifications (TS) set by the European Telecommunications Standards Institute (ETSI). According ETSI TS 103 221-1 V1.6.1 (hereinafter called ETSI TS 103 221-1), commands are transmitted from an ADMF to a NE via an X1 interface as LI tasks, e.g. activate, modify and deactivate task. Commands are transmitted using a message structure specified in ETSI TS 103 221-1 and the NE responds to the ADMF with a response message also specified in ETSI TS 103 221-1. During LI, the POI in the NE transmits, via X2 and X3 interfaces, interception data as a stream of X2/X3 protocol data units (PDU) to the MF according to ETSI TS 103 221-2 V1.1.1, hereinafter called ETSI TS 103 221-2.

The Intercepted traffic is delivered by the POI in the NE to a destination as specified in ETSI TS 103 221-1. Each Destination is uniquely identified by a destination identifier (DID) and is handled independently from details of the LI task. Each LI task is associated with one or more destinations. The destination can be created and modified using a specific message and it is related to X2 and X3 delivery type (See FIG. 1).

Since the exchanged messages via the X1 interface and data transmission via the X2 and X3 interfaces may change, also in a not backward compatible way, according to the evolution of the standard specifications, the standard specifications require that in the header of the messages and in the data transmitted via the X1 and X2/X3 interfaces there is also information about the version of the standard specification according to which the transmitting entity operates. The reason for this is that the receiver of the message (NE or ADMF) and receiver of data (MF) will know which standard protocol version to use for reading the message and the data. Specifically, when transmitting via the X1 interface, the transmitting entity is required to send information about the ETSI TS 103 221-1 standard version used, while via the X2 and X3 interfaces, the transmitting entity is required to send information about the ETSI TS 103 221-2 standard version used.

From a receiving entity's perspective, in case a message received via the X1 interface contains in the header a not supported version of the standard specification, an error response message will be sent back to the transmitting entity. An error code 1020 "Unsupported version" is used and an information element contains the version supported by the issuing system (i.e. the entity that sends back the error response message). By this, the transmitting entity sending the request message is informed that the protocol version is not supported by the receiving entity.

However, with regard to transmission via the X2/X3 interfaces, in case the data received by the MF via the X2 and/or the X3 interface contain, in the header, a not supported version of the standard specification the standard specifications do not require any transmission of an error response message. This means that, if the version of the standard specification used by the POI to send data via the X2/X3 interfaces is not supported by the MF, there is no way for the MF to inform the POI about that disability. This results in that the POI is unable to perform any adaptation procedure to align the version of the standard specification used by the POI with a version supported by the MF.

Furthermore, transmission of data by the POI via the X2/X3 interfaces to the MF using an unsupported version of the standard specification may cause the MF not being able to send the X2/X3 data in a proper manner to a law enforcement authority, which may lead to the data being misunderstood and even discarded. In the prior art, the procedure to overcome such drawbacks is to manually configure the POI in the NE to use a specific version of the standard specifications for transmission via the X2/X3 interfaces according to the ones supported by the MF.

SUMMARY

In view of the above, an object of the present disclosure is to overcome drawbacks related to transmission via the X2 and X3 interfaces. This object is achieved in a first aspect by a method performed by a LI ADMF in a telecommunication network.

The method of the first aspect comprises transmitting to a POI in NE, via an X1 interface, a request associated with a destination to which the POI is to transmit intercepted data via an X2 and/or an X3 interface during subsequent lawful interception. The request comprises a destination identifier (DID) of the destination and version information that specifies at least one version of a transmission protocol to use by the POI for transmission of intercepted data to the destination identified by the DID via the X2 and/or the X3 interface during the subsequent lawful interception. The method further comprises receiving, from the POI via the X1 interface, a response that indicates whether or not the POI is able to transmit intercepted data via the X2 and/or the X3 interface using a version of the transmission protocol that is equal to one of the versions in the transmitted version information.

In other words, an automatic protocol selection is performed via the X1 interface without any manual intervention. Such a method enables exchange of data via the X2 and X3 interfaces between the POI and an MF with the highest version supported by both parts. This has an advantage in that it avoids any intercepted data that is conveyed via the X2 and X3 interfaces to be lost or mis-interpreted. Moreover, it eliminates or at least reduces the need for manual configuration steps, which, as is the case in prior art where manual configuration is necessary, increases the installation and maintenance costs and increase the risk of faults. Instead, the method of the first aspect provides a fully automatic configuration, which for example is an enabler for the deployment of virtual network function (VNF) implementation in a cloud scenario with, e.g., a "one-click" configuration procedure. That is, the method of the first aspect reduces the operating expense (OPEX) and reduces the risk of manual mistakes during installation and upgrades. Also, any protocol update will be automatically reported among the entities POI/NE and ADMF/MF without the need of manual configuration, whereby risk of manual mistakes is eliminated or at least reduced.

In some embodiments, the received response specifies that the POI is able to transmit intercepted data via the X2 and/or the X3 interface using a version of the transmission protocol that is equal to one of the versions in the transmitted version information. In such embodiments, the received response specifies the version of the transmission protocol that the POI is to use to transmit intercepted data via the X2 and/or the X3 interface.

In some embodiments, the received response specifies that the POI is not able to transmit intercepted data via the X2 and/or the X3 interface using a version of the transmission protocol that is equal to one of the versions in the transmitted version information. In such embodiments, the received response specifies the version of the transmission protocol that the POI is able to use to transmit intercepted data via the X2 and/or the X3 interface.

In a further aspect, there is provided a method performed by a LI POI in a NE in a telecommunication network. The method of this further aspect comprises receiving, from a LI ADMF, via an X1 interface, a request associated with a destination to which the POI is to transmit intercepted data via an X2 and/or an X3 interface during subsequent lawful interception. The request comprises a DID of the destination and version information that specifies at least one version of a transmission protocol to use by the POI for transmission of intercepted data to the destination identified by the DID via the X2 and/or the X3 interface during the subsequent lawful interception. Having received the request, the POI determines whether or not the POI is able to transmit intercepted data via the X2 and/or the X3 interface using a version of the transmission protocol that is equal to one of the versions in the received version information. The determination comprises a comparison of the received version information with version information already available in the POI that specifies at least one version of a transmission protocol that the POI is able to use to transmit intercepted data via an X2 and/or an X3 interface. A response is then transmitted to the ADMF via the X1 interface, the response indicating whether or not the POI is able to transmit intercepted data via the X2 and/or the X3 interface using a version of the transmission protocol that is equal to one of the versions in the received version information.

In some embodiments, it is determined that the POI is able to transmit intercepted data via the X2 and/or the X3 interface using a version of the transmission protocol that is equal to one of the versions in the received version information. Such embodiments comprise determining a highest version of the transmission protocol that the POI is to use to transmit intercepted data via an X2 and/or an X3 interface. This determination utilizes said version information already available in the POI. The transmitted response then specifies that the POI is to transmit intercepted data via the X2 and/or the X3 interface using a version of the transmission protocol that is equal to one of the versions in the received version information and the transmitted response also specifies the determined highest version of the transmission protocol.

In some embodiments, it is determined that the POI is not able to transmit intercepted data via the X2 and/or the X3 interface using a version of the transmission protocol that is equal to one of the versions in the received version information. Such embodiments comprise determining a highest version of the transmission protocol that the POI is able to use to transmit intercepted data via an X2 and/or an X3 interface. This determination utilized said version information already available in the POI. The transmitted response then specifies that the POI is not able to transmit intercepted data via the X2 and/or the X3 interface using a version of the transmission protocol that is equal to one of the versions in the received version information and the transmitted response also specifies the determined highest version of the transmission protocol.

The request that is transmitted by the ADMF and received by the POI may be a CreateDestinationRequest or a ModifyDestinationRequest of the ETSI technical specification 103 221-1. Similarly, the response transmitted by the POI to the ADMF may be a CreateDestinationResponse or a ModifyDestinationResponse of the ETSI technical specification 103 221-1 and in some embodiments, the response is an ErrorResponse of the ETSI technical specification 103 221-1.

In yet a further aspect, there is provided a computer system comprising a plurality of server blades, each server blade comprising a processor and a memory, said memory containing instructions executable by said processor whereby said computer system is operative to perform a method as summarized above.

In yet a further aspect, there is provided a computer program comprising instructions which, when executed on at least one processor in a server blade in a computer system, cause the computer system to carry out a method as summarized above.

In yet a further aspect, there is provided a carrier, comprising the computer program as summarized above, wherein the carrier is one of an electronic signal, an optical signal, a radio signal and a computer readable storage medium.

These further aspects and embodiments of these further aspects provide the same effects and advantages as summarized above in connection with the method of the first aspect.

BRIEF DESCRIPTION OF THE DRAWINGS

FIGS. 3a-c are signaling diagrams illustrating signals transmitted in the methods illustrated in FIGS. 2a-b, FIG. 4 schematically illustrates a computer system, and FIGS. 5a-b schematically illustrate a respective computer system.

DETAILED DESCRIPTION

Figure 1A:
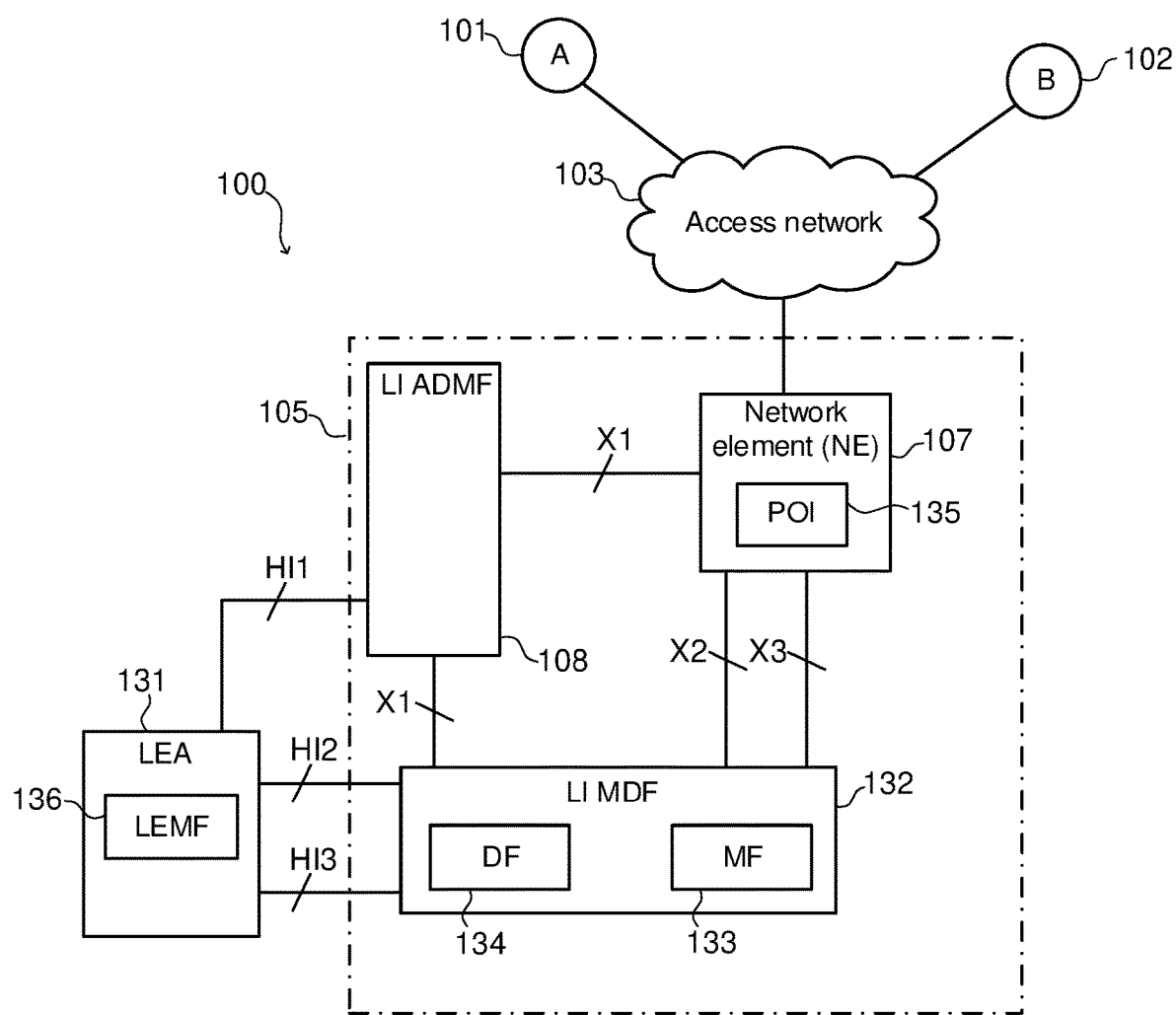
FIGS. 1a-b are schematically illustrated block diagrams of LI systems.

FIG. 1a schematically illustrates a first functional representation of a telecommunication network 100 comprising a core network 105 and an access network 103 in which two communicating entities, a first communicating entity 101 and a second communicating entity 102 are connected. The access network may, e.g., be in the form of a 3GPP radio access network (RAN) or any other type of non-3GPP communication network that may connect to the core network 105.

As the skilled person will realize, communication performed by the first and second communicating entities 101, 102 is enabled by several functional units in both the access network 103 and the core network 105. For the sake of clarity of description, such functional units are not illustrated in full but only schematically represented and exemplified by a network element (NE) 107 that, in a 4G context, may be a mobility management entity (MME), a serving gateway (S-GW), a packet data network gateway (P-GW) etc. In a 5G context, the network element 107 may, e.g., be in the form of a policy control function (PCF), a user data management function (UDM), an Access and Mobility Management Function (AMF) or a session management function (SMF) etc. The network element may even be an SMS-Function (SMSF). A common characteristic of such functional units, as represented by network element 107, in the core network 105 is that they may comprise LI functionality in the form of a point of interception (POI) 135. The POI 135 is in FIG. 1a thus depicted as being a part of the network element 107 or being embedded therein, but the POI 135 may also be separate from the network element 107 with which it is associated. The core network 105 may be the core network of a serving network (SN), which may be a Visited Public Land Mobile Network (VPLMN) or a Home Public Land Mobile Network (HPLMN).

The core network 105 also comprises an administrative function (ADMF) 108 and a mediation and delivery function (MDF) 132 that connects to a law enforcement agency (LEA) 131. Within the MDF 132 a mediation function (MF) 133 and a delivery function (DF) 134 are configured to handle an intercept product in the form of intercept related information (IRI) and content of communication (CC) received from the POI 135 and provide the IRI and CC to the LEA 131. The LEA 131 manages a law enforcement monitoring facility (LEMF) 136, which receives IRI and CC from the DF 134.

As mentioned above, communication between the entities takes place via X1, X2 and X3 interfaces. That is, the ADMF 108 communicates with the MF 133, DF 134 and the POI 135 in the NE 107 via the X1 interface. The POI 135 in the NE 107 communicates with the MF 133 via the X2 and X3 interfaces. The ADMF 108 also communicates with the LEA 131 via an HI1 interface and the DF 134 communicates with the LEMF 136 in the LEA 131 via HI2 and HI3 interfaces.

Figure 1B:
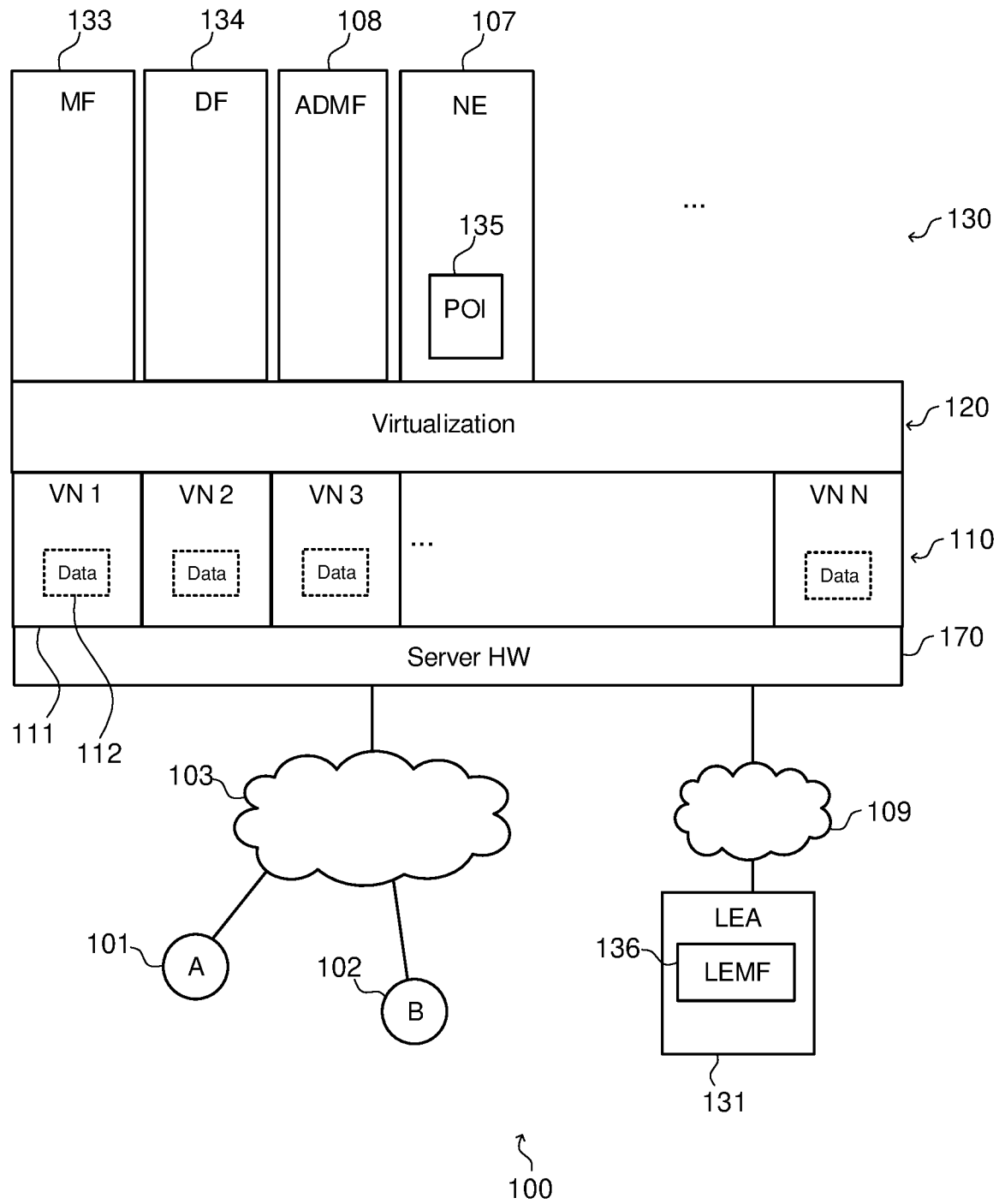

FIG. 1b schematically illustrates a second functional representation of the telecommunication network 100. In this second functional representation, the telecommunication network 100 is realized at least in part by virtualized functions that are executed on virtual nodes 110 that utilize a hardware server platform 170. The MF 133, the DF 134, the ADMF 108, the NE 107 and the POI 135 are realized in a functional layer 130 of virtualized network functions (VNF) that execute in the virtual nodes 110 via a virtualization layer 120. For example, a virtual node 111 is a collection of software instructions as well as associated data 112 as the skilled person will realize. The LEA 131 with its LEMF 136 is connected to the hardware platform 170 via an intermediate network 109, the details of which are outside the scope of the present disclosure. Although not explicitly illustrated in FIG. 1b, communication between entities via the X1, X2, X3, HI1, HI2 and HI3 interfaces take place as described above in connection with FIG. 1a.

The ADMF 108, the MF 133, the DF 134 and the POI 135 as well as the LEMF 136 may all be embodied as software installed in one or more hardware devices, which all comprise processing and storage resources that are configured to realize and handle LI information as will be exemplified in detail below.

Turning now to FIGS. 2a-b and FIGS. 3a-c, and with continued reference to FIGS. 1a-b, embodiments of methods in the telecommunication network 100 will be described in some more detail. The embodiments will exemplify how the various functional units and interfaces described above may be enhanced in order to provide the effect and advantages associated with communication via the X2 and X3 interfaces between the POI and the MF 133 and/or the DF 134.

Figure 2A:
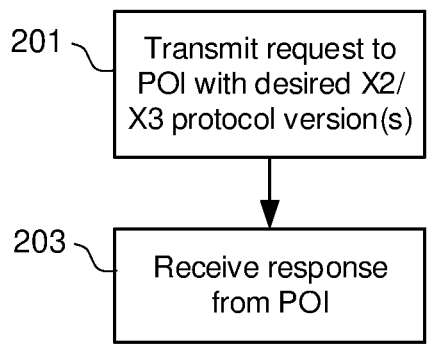
FIGS. 2a-b are flowcharts of methods.

FIG. 2a illustrates a method that comprises actions performed by the ADMF 108 in the telecommunication network 100 introduced and described above in connection with FIGS. 1a-b:

Action 201

The ADMF 108 transmits, to the POI 135 in the NE via the X1 interface, a request 303 associated with a destination 133, 134 to which the POI is to transmit intercepted data via the X2 and/or the X3 interface during subsequent lawful interception. The request 303 comprises a DID of the destination 133, 134 and version information that specifies at least one version of a transmission protocol to use by the POI 135 for transmission of intercepted data to the destination 133, 134 identified by the DID via the X2 and/or the X3 interface during the subsequent lawful interception.

Action 203

The ADMF 108 receives, from the POI 135 via the X1 interface, a response 305 that indicates whether or not the POI 135 is able to transmit intercepted data via the X2 and/or the X3 interface using a version of the transmission protocol that is equal to one of the versions in the version information transmitted in action 201.

The response 305 received in action 203 may be a response 325 that specifies that the POI 135 is able to transmit intercepted data via the X2 and/or the X3 interface using a version of the transmission protocol that is equal to one of the versions in the transmitted version information. In such a case, the received response 325 specifies the version of the transmission protocol that the POI 135 is to use to transmit intercepted data via the X2 and/or the X3 interface.

On the other hand, the response 305 received in action 203 may be a response 335 that specifies that the POI 135 is not able to transmit intercepted data via the X2 and/or the X3 interface using a version of the transmission protocol that is equal to one of the versions in the transmitted version information. In such a case, the received response 335 specifies the version of the transmission protocol that the POI 135 is able to use to transmit intercepted data via the X2 and/or the X3 interface.

Figure 2B:
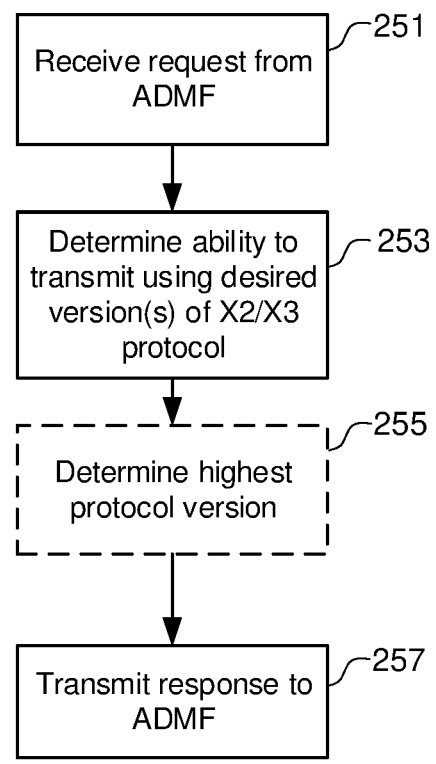

FIG. 2b illustrates a method that comprises actions performed by the POI 135 that correspond to the actions performed by the ADMF 108 as described above:

Action 251

The POI 135 receives, from the ADMF via the X1 interface, a request 303 associated with a destination 133, 134 to which the POI 135 is to transmit intercepted data via an X2 and/or an X3 interface during subsequent lawful interception. The request 303 comprises a DID of the destination 133, 134 and version information that specifies at least one version of a transmission protocol to use by the POI 135 for transmission of intercepted data to the destination 133, 134 identified by the DID via the X2 and/or the X3 interface during the subsequent lawful interception.

Action 253

The POI 135 then determines whether or not the POI 135 is able to transmit intercepted data via the X2 and/or the X3 interface using a version of the transmission protocol that is equal to one of the versions in the received version information. The determination comprises a comparison of the received version information with version information already available in the POI 135 that specifies at least one version of a transmission protocol that the POI 135 is able to use to transmit intercepted data via the X2 and/or an X3 interface.

Action 257

The POI 135 then transmits, to the ADMF (108) via the X1 interface, a response 305 that indicates whether or not the POI 135 is able to transmit intercepted data via the X2 and/or the X3 interface using a version of the transmission protocol that is equal to one of the versions in the received version information.

If it is determined, in action 253, that the POI 135 is able to transmit intercepted data via the X2 and/or the X3 interface using a version of the transmission protocol that is equal to one of the versions in the received version information, the method further comprises a determining action 255 to determine a highest version of the transmission protocol that the POI 135 is to use to transmit intercepted data via an X2 and/or an X3 interface. This determination action 255 utilizes the version information already available in the POI 135. The response 305 transmitted in action 257 is then a response 325 that specifies that the POI 135 is to transmit intercepted data via the X2 and/or the X3 interface using a version of the transmission protocol that is equal to one of the versions in the received version information. Moreover, the response 325 transmitted in action 257 then specifies the determined, in action 255, highest version of the transmission protocol.

On the other hand, if it is determined in action 253 that the POI 135 is not able to transmit intercepted data via the X2 and/or the X3 interface using a version of the transmission protocol that is equal to one of the versions in the received version information, the determining action 255 determines a highest version of the transmission protocol that the POI 135 is able to use to transmit intercepted data via an X2 and/or an X3 interface, the determination in action 255 utilizing said version information already available in the POI 135. The response 305 transmitted in action 257 is then a response 335 that specifies that the POI 135 is not able to transmit intercepted data via the X2 and/or the X3 interface using a version of the transmission protocol that is equal to one of the versions in the received version information. Moreover, the response 335 transmitted in action 257 then specifies the determined, in action 255, highest version of the transmission protocol.

The request 303 that is transmitted by the ADMF 108 in action 201 and received by the POI 135 in action 251 may be a CreateDestinationRequest or a ModifyDestinationRequest of the ETSI technical specification 103 221-1. Such a request may then entail adding a field, e.g. "List of DIDProtocolVersions", to the destination details as explained in table 14 of ETSI technical specification 103 221-1:

| Field | Description | Format | M/C/O |
|---|---|---|---|
| DID | Destination Identifier which uniquely identifies the destination | UUIDv4 (see clause 5.1) | M |
| FriendlyName | A human-readable name associated with the delivery destination | Free-text string | O |
| DeliveryType | Statement of whether to deliver X2 and/or X3 to this destination | Enumerated value - one of "X2Only", "X3Only", and "X2andX3" | M |
| DeliveryAddress | One of the values from table 15 shall be included | As defined in table 15 | M |
| DestinationDetailsExtensions | One or more extension placeholders; each may be populated by a list of elements defined by external specifications | See annex B | O |
| ListOfDIDProtocolVersions | Versions of ETSI TS 103 221-2, clause 5.2.1 supported by MF | As defined in Table 1 of ETSI TS 103 221-2 | M |

An actual CreateDestinationRequest may then be realized as follows:

```
<ns1:X1Request xmlns:ns1="http://uri.etsi.org/03221/X1/2017/10"
xmlns:ns2="http://uri.etsi.org/03280/common/2017/07"
xmlns:xsi="http://www.w3.org/2001/XMLSchema-instance">
  <ns1:x1RequestMessage xsi:type="ns1:CreateDestinationRequest">
    <ns1:admfIdentifier>admfID</ns1:admfIdentifier>
    <ns1:neIdentifier>neID</ns1:neIdentifier>
    <ns1:messageTimestamp>2017-10-06T18:46:21.446605Z</ns1:messageTimestamp>
    <ns1:version>v1.6.1</ns1:version>
    <ns1:x1TransactionId>8e8ca539-e4dd-41f3-b1cb-acc2a5edece0</ns1:x1TransactionId>
    <ns1:destinationDetails>
      <ns1:dId>b0ce308c-aa17-42bd-a27b-287bcb5b3468</ns1:dId>
      <ns1:deliveryType>X2andX3</ns1:deliveryType>
      <ns1:deliveryAddress>
        <ns1:ipAddressAndPort>
          <ns2:address>
            <ns2:IPv4Address>192.0.2.2</ns2:IPv4Address>
          </ns2:address>
          <ns2:port>
            <ns2:TCPPort>12345</ns2:TCPPort>
          </ns2:port>
        </ns1:ipAddressAndPort>
      </ns1:deliveryAddress>
      <ns1:listOfDIDProtocolVersions>
        <ns1:dIDProtocolVersion>1</ns1:dIDProtocolVersion>
      </ns1:listOfDIDProtocolVersions>
    </ns1:destinationDetails>
```

-continued

```
  </ns1:x1RequestMessage>
</ns1:X1Request>
```

As the skilled person will realize, a ModifyDestinationRequest will comprise similar schema as for the CreateDestinationRequest exemplified above.

Similarly, the response 325 transmitted by the POI 135 in action 257 and received by the ADMF 108 in action 203 may be a CreateDestinationResponse or a ModifyDestinationResponse of the ETSI technical specification 103 221-1. Such a response, will comprise similar schema as that of the CreateDestinationRequest exemplified above. That is:

```
<ns1:X1Response xmlns:ns1="http://uri.etsi.org/03221/X1/2017/10"
xmlns:xsi="http://www.w3.org/2001/XMLSchema-instance">
  <ns1:x1ResponseMessage xsi:type="ns1:CreateDestinationResponse">
    <ns1:admfIdentifier>admfID</ns1:admfIdentifier>
    <ns1:neIdentifier>neID</ns1:neIdentifier>
    <ns1:messageTimestamp>2017-10-06T18:46:21.446605Z</ns1:messageTimestamp>
    <ns1:version>v1.6.1</ns1:version>
    <ns1:x1TransactionId>8e8ca539-e4dd-41f3-b1cb-acc2a5edece0</ns1:x1TransactionId>
    <ns1:oK>AcknowledgedAndCompleted</ns1:oK>
      <ns1:dIDProtocolVersion>1</ns1:dIDProtocolVersion>
  </ns1:x1ResponseMessage>
</ns1:X1Response>
```

Such cases may then entail adding a field, e.g. "List of DIDProtocolVersions", to the destination details as explained in table 13 and 17 of ETSI technical specification 103 221-1:

| Field | Description | Format | M/C/O |
|---|---|---|---|
| OK or Error | The general errors in clause 6.7 apply. Also, it is an error if the DID is already present at the NE | See clause 6.7 | M |
| DIDProtocolVersion | Version of ETSI TS 103 221-2, clause 5.2.1 supported by MF | As defined in Table 1 of ETSI TS 103 221-2 | O |

It is to be noted that a response may also follow a schema of a prior art CreateDestinationResponse or ModifyDestinationResponse.

The response 305 may in the cases where the POI 135 is not able to transmit intercepted data via the X2 and/or the X3 interface using a version of the transmission protocol that is equal to one of the versions in the received version information be the response 335 that may be an ErrorResponse of the ETSI technical specification 103 221-1. Such an error response may comprise a schema such as:

```
<ns1:X1Response xmlns:ns1="http://uri.etsi.org/03221/X1/2017/10"
xmlns:xsi="http://www.w3.org/2001/XMLSchema-instance">
  <ns1:x1ResponseMessage xsi:type="ns1: ErrorResponse">
    <ns1:admfIdentifier>admfID</ns1:admfIdentifier>
    <ns1:neIdentifier>neID</ns1:neIdentifier>
    <ns1:messageTimestamp>2017-10-06T18:46:21.446605Z</ns1:messageTimestamp>
    <ns1:version>v1.6.1</ns1:version>
    <ns1:x1TransactionId>8e8ca539-e4dd-41f3-b1cb-acc2a5edece0</ns1:x1TransactionId>
    <ns1: requestMessageType>CreateDestination</ns1: requestMessageType>
      <ns1: errorInformation>
      <ns1: errorCode>6030</ns1: errorCode>
      <ns1: errorDescription>Unsupported DIDProtocolVersion: Supported version 2</ns1: errorDescription>
      </ns1: errorInformation>
   </ns1:x1ResponseMessage>
</ns1:X1Response>
```

Such an error response may then entail adding an error code and a field, e.g. "Unsupported DIDProtocolVersion", to the error codes as explained in table 46 of ETSI technical specification 103 221-1 (noting that 6030 is an example of a possible new error code to use, any value starting with six thousand is acceptable):

| Error Code | Error Description | Suggested Information elements |
|---|---|---|
| | General message errors | |
| 1000 | Generic error | Free-text string |
| ... | ... | ... |
| | CreateDestination/ModifyDestination failures | |
| 6000 | Generic CreateDestination failure | Details of why the Destination cannot be |
| 6001 | Generic ModifyDestination failure | Details of why the Destination cannot be |
| 6020 | Unsupported DeliveryAddress type | Details of the DeliveryAddress type |
| 6030 | Unsupported DIDProtocolVersion | Version supported by the issuing |
| | RemoveDestination failures | |
| ... | ... | ... |

Figure 4:
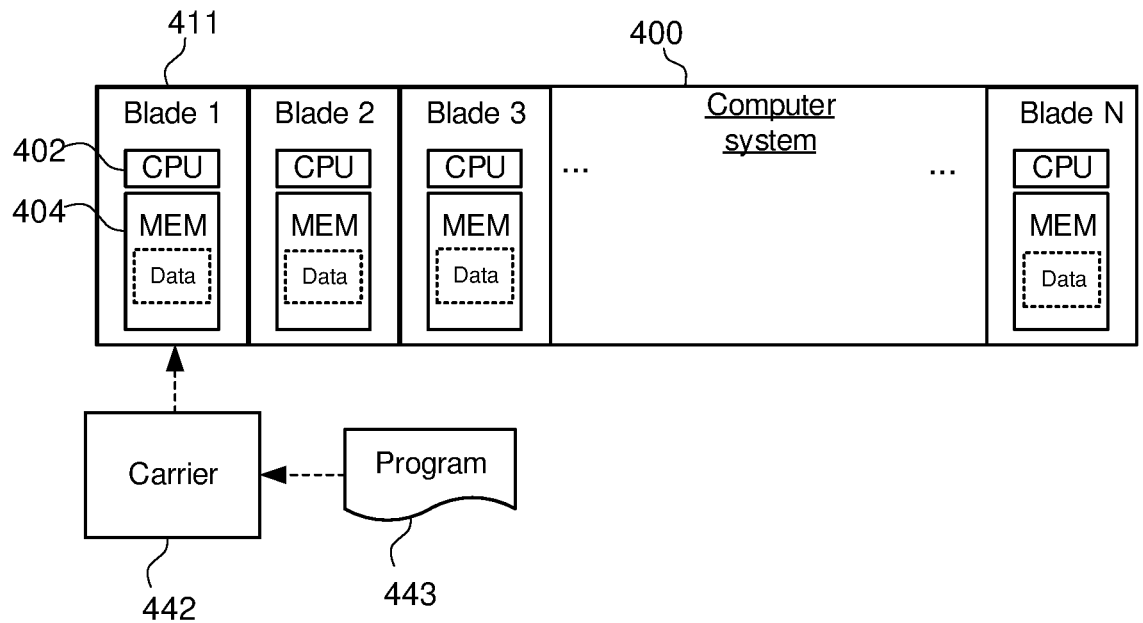

Turning now to FIG. 4, and with continued reference to FIGS. 1-3, a computer system 400 will be described in some detail. The computer system 400, which may correspond to at least part of the telecommunication network 100, comprises a plurality of server blades 411 that comprise a processor 402 and a memory 404. The memory 404 contains instructions executable by the processor 402 whereby the computer system 400 is operative to:
  transmit, to a point of interception (POI) in a network element (NE) via an X1 interface, a request associated with a destination to which the POI is to transmit intercepted data via an X2 and/or an X3 interface during subsequent lawful interception, wherein the request comprises:
    a destination identifier (DID) of the destination,
    version information that specifies at least one version of a transmission protocol to use by the POI for transmission of intercepted data to the destination identified by the DID via the X2 and/or the X3 interface during the subsequent lawful interception, and
  receive, from the POI via the X1 interface, a response that indicates whether or not the POI is able to transmit intercepted data via the X2 and/or the X3 interface using a version of the transmission protocol that is equal to one of the versions in the transmitted version information.

The instructions that are executable by the processor 402 may be software in the form of a computer program 443. The computer program 443 may be contained in or by a carrier 442, which may provide the computer program 443 to the memory 404 and processor 402. The carrier 442 may be in any suitable form including an electronic signal, an optical signal, a radio signal or a computer readable storage medium.

In some embodiments, the computer system 400 is operative such that the received response specifies that the POI is able to transmit intercepted data via the X2 and/or the X3 interface using a version of the transmission protocol that is equal to one of the versions in the transmitted version information, and configured such that the received response specifies the version of the transmission protocol that the POI is to use to transmit intercepted data via the X2 and/or the X3 interface.

In some embodiments, the computer system 400 is operative such that the received response specifies that the POI is not able to transmit intercepted data via the X2 and/or the X3 interface using a version of the transmission protocol that is equal to one of the versions in the transmitted version information, and configured such that the received response specifies the version of the transmission protocol that the POI is able to use to transmit intercepted data via the X2 and/or the X3 interface.

Continuing with reference to FIG. 4 and with continued reference to FIGS. 1-3, a computer system 400 will be described in some detail. The computer system 400, which may correspond to at least part of the telecommunication network 100, comprises a plurality of server blades 411 that comprise a processor 402 and a memory 404. The memory 404 contains instructions executable by the processor 402 whereby the computer system 400 is operative to:
  receive, from a LI administrative function (ADMF), via an X1 interface, a request associated with a destination to which the POI is to transmit intercepted data via an X2 and/or an X3 interface during subsequent lawful interception, wherein the request comprises:
    a destination identifier (DID) of the destination, and
    version information that specifies at least one version of a transmission protocol to use by the POI for transmission of intercepted data to the destination identified by the DID via the X2 and/or the X3 interface during the subsequent lawful interception,
  determine whether or not the POI is able to transmit intercepted data via the X2 and/or the X3 interface using a version of the transmission protocol that is equal to one of the versions in the received version information, said determination comprising a comparison of the received version information with version information already available in the POI that specifies at least one version of a transmission protocol that the POI is able to use to transmit intercepted data via an X2 and/or an X3 interface, and
  transmit, to the ADMF via the X1 interface, a response that specifies indicates whether or not the POI is able to transmit intercepted data via the X2 and/or the X3 interface using a version of the transmission protocol that is equal to one of the versions in the received version information.

The instructions that are executable by the processor 402 may be software in the form of a computer program 443. The computer program 443 may be contained in or by a carrier 442, which may provide the computer program 443 to the memory 404 and processor 402. The carrier 442 may be in any suitable form including an electronic signal, an optical signal, a radio signal or a computer readable storage medium.

In some embodiments, the computer system 400 is operative such that it is determined that the POI is able to transmit intercepted data via the X2 and/or the X3 interface using a version of the transmission protocol that is equal to one of the versions in the received version information, and further operative to:
- determine a highest version of the transmission protocol that the POI is to use to transmit intercepted data via an X2 and/or an X3 interface, said determination utilizing said version information already available in the POI, and operative such that:
- the transmitted response specifies that the POI is to transmit intercepted data via the X2 and/or the X3 interface using a version of the transmission protocol that is equal to one of the versions in the received version information, and
- the transmitted response specifies the determined highest version of the transmission protocol.

In some embodiments, the computer system 400 is operative such that it is determined that the POI is not able to transmit intercepted data via the X2 and/or the X3 interface using a version of the transmission protocol that is equal to one of the versions in the received version information, and further operative to:
- determine a highest version of the transmission protocol that the POI is able to use to transmit intercepted data via an X2 and/or an X3 interface, said determination utilizing said version information already available in the POI, and operative such that:
- the transmitted response specifies that the POI is not able to transmit intercepted data via the X2 and/or the X3 interface using a version of the transmission protocol that is equal to one of the versions in the received version information, and
- the transmitted response specifies the determined highest version of the transmission protocol.

In some embodiments, the computer system 400 is operative such that the request is:
- a CreateDestinationRequest, or
- a ModifyDestinationRequest of the European Telecommunications Standards Institute, ETSI, technical specification 103 221-1.

In some embodiments, the computer system 400 is operative such that the response is:
- a CreateDestinationResponse, or
- a ModifyDestinationResponse of the ETSI technical specification 103 221-1.

In some embodiments, the computer system 400 is operative such that the response is an ErrorResponse of the ETSI technical specification 103 221-1.

Figure 5A:
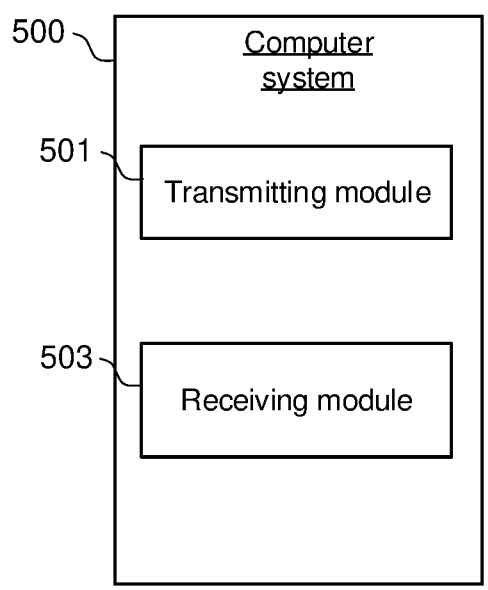

Turning now to FIG. 5*a*, and with continued reference to FIGS. 1-4, a computer system 500 will be described in some detail. The computer system 500 comprises:
- a transmitting module (501) configured to transmit, to a point of interception (POI) in a network element (NE) via an X1 interface, a request associated with a destination to which the POI is to transmit intercepted data via an X2 and/or an X3 interface during subsequent lawful interception, wherein the request comprises:
  - a destination identifier (DID) of the destination,
  - version information that specifies at least one version of a transmission protocol to use by the POI for transmission of intercepted data to the destination identified by the DID via the X2 and/or the X3 interface during the subsequent lawful interception, and
- a receiving module (503) configured to receive, from the POI via the X1 interface, a response that indicates whether or not the POI is able to transmit intercepted data via the X2 and/or the X3 interface using a version of the transmission protocol that is equal to one of the versions in the transmitted version information.

The computer system 500 may comprise further modules that are configured to perform in a similar manner as, e.g., a computer system 400 described above in connection with FIG. 4.

Figure 5B:
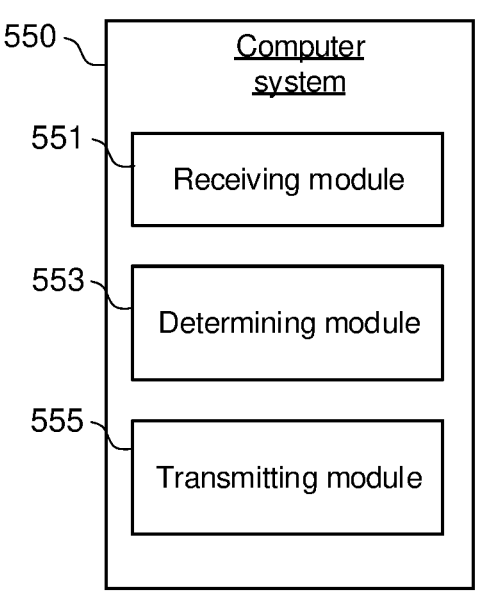

Turning now to FIG. 5*b*, and with continued reference to FIGS. 1-4, a computer system 550 will be described in some detail. The computer system 550 comprises:
- a receiving module (551) configured to receive, from a LI administrative function (ADMF), via an X1 interface, a request associated with a destination to which the POI is to transmit intercepted data via an X2 and/or an X3 interface during subsequent lawful interception, wherein the request comprises:
  - a destination identifier (DID) of the destination, and
  - version information that specifies at least one version of a transmission protocol to use by the POI for transmission of intercepted data to the destination identified by the DID via the X2 and/or the X3 interface during the subsequent lawful interception,
- a determining module (553) configured to determine whether or not the POI is able to transmit intercepted data via the X2 and/or the X3 interface using a version of the transmission protocol that is equal to one of the versions in the received version information, said determination comprising a comparison of the received version information with version information already available in the POI that specifies at least one version of a transmission protocol that the POI is able to use to transmit intercepted data via an X2 and/or an X3 interface, and
- a transmitting module (555) configured to transmit, to the ADMF via the X1 interface, a response that specifies indicates whether or not the POI is able to transmit intercepted data via the X2 and/or the X3 interface using a version of the transmission protocol that is equal to one of the versions in the received version information.

The computer system 550 may comprise further modules that are configured to perform in a similar manner as, e.g., a computer system 400 described above in connection with FIG. 4.

The invention claimed is:

1. A method performed by a lawful interception (LI) administrative function (ADMF) in a telecommunication network, the method comprising:
   transmitting, to a point of interception (POI) in a network element (NE) via an X1 interface, a request associated with a destination to which the POI is to transmit intercepted data via an X2 and/or an X3 interface during subsequent lawful interception, wherein the request comprises:
   a destination identifier (DID) of the destination,
   version information that specifies one or more versions of a transmission protocol to use by the POI for transmission of intercepted data to the destination identified by the DID via the X2 and/or the X3 interface during the subsequent lawful interception, and receiving, from the POI via the X1 interface, a response that indicates that the POI is not able to transmit intercepted data via the X2 and/or the X3 interface using a version of the transmission protocol that is equal to any one of the one or more versions in the transmitted version information.

2. The method of claim 1, wherein the received response specifies a version of the transmission protocol that the POI is able to use to transmit intercepted data via the X2 and/or the X3 interface.

3. The method of claim 1, wherein the request is a CreateDestinationRequest, or a ModifyDestinationRequest, of the European Telecommunications Standards Institute, ETSI, technical specification 103 221-1.

4. The method of claim 1, wherein the response is a CreateDestinationResponse, or a ModifyDestinationResponse, of the ETSI technical specification 103 221-1.

5. The method of claim 1, wherein the response is an ErrorResponse of the ETSI technical specification 103 221-1.

6. A method performed by a lawful interception (LI) point of interception (POI) in a network element (NE) in a telecommunication network, the method comprising:
receiving, from a LI administrative function (ADMF) via an X1 interface, a request associated with a destination to which the POI is to transmit intercepted data via an X2 and/or an X3 interface during subsequent lawful interception, wherein the request comprises:
a destination identifier (DID) of the destination, and
version information that specifies one or more versions of a transmission protocol to use by the POI for transmission of intercepted data to the destination identified by the DID via the X2 and/or the X3 interface during the subsequent lawful interception,
determining whether or not the POI is able to transmit intercepted data via the X2 and/or the X3 interface using a version of the transmission protocol that is equal to one of the one or more versions in the received version information, said determination comprising a comparison of the received version information with version information already available in the POI that specifies at least one version of a transmission protocol that the POI is able to use to transmit intercepted data via an X2 and/or an X3 interface, and
transmitting, to the ADMF via the X1 interface, a response that indicates that the POI is not able to transmit intercepted data via the X2 and/or the X3 interface using a version of the transmission protocol that is equal to any one of the one or more versions in the received version information.

7. The method of claim 6, wherein:
it is determined that the POI is not able to transmit intercepted data via the X2 and/or the X3 interface using a version of the transmission protocol that is equal to any one of the one or more versions in the received version information, and further comprising:
determining a highest version of the transmission protocol that the POI is able to use to transmit intercepted data via an X2 and/or an X3 interface, said determination utilizing said version information already available in the POI, and wherein:
the transmitted response specifies the determined highest version of the transmission protocol.

8. The method of claim 6, wherein the request is a CreateDestinationRequest, or a ModifyDestinationRequest, of the European Telecommunications Standards Institute, ETSI, technical specification 103 221-1.

9. The method of claim 6, wherein the response is a CreateDestinationResponse, or a ModifyDestinationResponse, of the ETSI technical specification 103 221-1.

10. The method of claim 6, wherein the response is an ErrorResponse of the ETSI technical specification 103 221-1.

11. The method of claim 7, further comprising transmitting intercepted data via the X2 and/or the X3 interface using the determined highest version of the transmission protocol as specified in the transmitted response.

12. A computer system comprising a plurality of server blades, each server blade comprising a processor and a memory, said memory containing instructions executable by said processor whereby said computer system is operative to:
transmit, to a point of interception (POI) in a network element (NE) via an X1 interface, a request associated with a destination to which the POI is to transmit intercepted data via an X2 and/or an X3 interface during subsequent lawful interception, wherein the request comprises:
a destination identifier (DID) of the destination,
version information that specifies one or more versions of a transmission protocol to use by the POI for transmission of intercepted data to the destination identified by the DID via the X2 and/or the X3 interface during the subsequent lawful interception, and
receive, from the POI via the X1 interface, a response that indicates that the POI is not able to transmit intercepted data via the X2 and/or the X3 interface using a version of the transmission protocol that is equal to any one of the one or more versions in the transmitted version information.

13. A computer system comprising a plurality of server blades, each server blade comprising a processor and a memory, said memory containing instructions executable by said processor whereby said computer system is operative to:
receive, from a LI administrative function (ADMF) via an X1 interface, a request associated with a destination to which a lawful interception (LI) point of interception (POI) in a network element (NE) in a telecommunication network is to transmit intercepted data via an X2 and/or an X3 interface during subsequent lawful interception, wherein the request comprises:
a destination identifier (DID) of the destination, and
version information that specifies one or more versions of a transmission protocol to use by the POI for transmission of intercepted data to the destination identified by the DID via the X2 and/or the X3 interface during the subsequent lawful interception,
determine whether or not the POI is able to transmit intercepted data via the X2 and/or the X3 interface using a version of the transmission protocol that is equal to one of the one or more versions in the received version information, said determination comprising a comparison of the received version information with version information already available in the POI that specifies at least one version of a transmission protocol that the POI is able to use to transmit intercepted data via an X2 and/or an X3 interface, and transmit, to the ADMF via the X1 interface, a response that indicates that the POI is not able to transmit intercepted data via the X2 and/or the X3 interface using a version of the transmission protocol that is equal to any one of the one or more versions in the received version information.

* * * * *